United States Patent
Haley et al.

(10) Patent No.: US 6,749,497 B2
(45) Date of Patent: *Jun. 15, 2004

(54) APPARATUS AND METHOD OF EDIBLE FEET HARVEST AND PAW PRODUCTION

(75) Inventors: Bobby Z. Haley, Fayetteville, AR (US); Brandon C. Haley, Springdale, AR (US); Kelly Lasse, Fayetteville, AR (US); Marshall Vanderpool, Bentonville, AR (US)

(73) Assignee: Tyson Foods, Inc., Springdale, AR (US)

( * ) Notice: Subject to any disclaimer, the term of this patent is extended or adjusted under 35 U.S.C. 154(b) by 38 days.

This patent is subject to a terminal disclaimer.

(21) Appl. No.: 10/260,099

(22) Filed: Sep. 30, 2002

(65) Prior Publication Data

US 2003/0190880 A1 Oct. 9, 2003

Related U.S. Application Data

(60) Provisional application No. 60/369,976, filed on Apr. 4, 2002.

(51) Int. Cl.[7] .................... A22C 18/00; A22C 21/00; A22C 25/00; A22C 25/14
(52) U.S. Cl. ..................................................... 452/167
(58) Field of Search ............................. 452/167, 187, 452/188, 166, 107

(56) References Cited

U.S. PATENT DOCUMENTS

| | | | | | |
|---|---|---|---|---|---|
| 3,042,186 | A | * | 7/1962 | Varney | 452/182 |
| 4,195,386 | A | * | 4/1980 | Dodd | 452/183 |
| 4,570,295 | A | * | 2/1986 | van Mil | 452/182 |
| 4,709,448 | A | * | 12/1987 | McGuire et al. | 452/167 |
| 6,283,848 | B1 | * | 9/2001 | Berry | 452/166 |
| 6,450,872 | B1 | * | 9/2002 | Haley et al. | 452/166 |

* cited by examiner

Primary Examiner—Charles T. Jordan
Assistant Examiner—Judith A. Nelson
(74) Attorney, Agent, or Firm—Mark E. Stallion; Blackwell Sanders Peper Martin, LLP

(57) ABSTRACT

A method and apparatus for partially cutting hock joints, and letting feet remain attached to the rest of carcass by skin and one or more tendons, exposing the hock joint by folding feet, and hanging the carcasses in the evisceration shackles by hock joints, the method unambiguously ensures that if a carcass is condemned by an Inspector, the feet belonging to that carcass are condemned as well. Furthermore, this invention solves the even more tractable problem of capturing folded feet, separating feet from the carcass while leaving the carcass still hanging in the shackles, transferring feet into an infeed paw cutter wheel, and cutting knuckle portion to produce chicken paws ready for further processing.

25 Claims, 11 Drawing Sheets

APPARATUS AND METHOD OF EDIBLE FEET HARVEST AND PAW PRODUCTION

CROSS-REFERENCE TO RELATED APPLICATION

This application claims the benefit of U.S. Provisional Patent Application Ser. No. 60/369,976, filed Apr. 4, 2002.

BACKGROUND OF INVENTION

1. Field of Invention

This invention relates generally to harvesting edible portions of meat from an animal carcass and, more particularly, to harvesting edible feet and paws from a poultry carcass.

2. Background Art

Until October 2001, U.S. was a big exporter of poultry feet or paws to China, it changed when China refused to accept chicken paw packages that did not bear USDA seal of inspection. In the U.S., in most instances chicken feet or paws are considered inedible as they are harvested or removed from the carcass before a determination on final disposition of a carcass is made, and, therefore, do not bear USDA seal of inspection because the feet once removed cannot later be correlated to a carcass. Although paws are graded for systemic and localized conditions, it can not be irrefutably proved that if an Inspector condemns a carcass because of systemic conditions, the feet or paws belonging to that particular carcass have been called during the grading process. A method and apparatuses that would ensure that when an Inspector condemns a carcass, feet or paws belonging to that particular carcass are condemned as well would be of value to the poultry industry.

BRIEF SUMMARY OF INVENTION

Per USDA, if a chicken carcass is discarded because of systemic issues, all parts associated with the carcass must also be discarded in a verifiable manner. This is accomplished by the present invention by hanging carcasses on evisceration shackles, hanging by a partially severed hock joint with feet folded over and hock joint exposed for inspection and removing the feet only after a determination on carcass disposition has been made by an inspector. This invention provides a method for (a) subsequent severance of feet from a carcass where the carcass remains firmly in the shackles, (b) transportation of severed feet to an infeed wheel of a paw cutter, and (c) final cutting of the knuckle part to produce a paw that can be further processed to obtain an edible product.

The present invention involves a method whereby the feet remain attached to the carcass through the USDA inspection step. This method involves partially severing the hock joint leaving the feet attached to the carcass by skin and a few tendons. The partial severing of the hock joint is performed by an adjustable blade that can be adjusted to sever the hock joint without completely severing through the joint. Once a partial severing of the hock joint has been completed the method includes the step of unloading the carcass from the kill line shackles and transferring the carcass to the evisceration line shackles either manually or mechanically where the carcass hangs in the shackle by the hock joint with the feet folded over. The series of evisceration line shackles are conveyed past the USDA inspectors where the hock joint is fully visible for inspection. If a carcass is rejected by the inspector the tenuously attached feet will also be rejected with the carcass. This process thereby eliminates the possibility of a carcass being rejected without the feet also being rejected. The inventive method continues by conveying the carcass that has been accepted and is hanging in the evisceration shackles adjacent the inspection station to a portion of the inventive apparatus which includes a guide bar which is inclined and designed to capture the feet and position the feet such that the hock joint can be completely severed as the joint moves across the edge of a stationery blade. The completely severed feet can then be transferred to a paw cutter device for severing the paw at the knuckle. This inventive method and apparatus allows the feet and paws to be harvested in such a manner that when a USDA inspector rejects a carcass, the feet of the carcass will also be rejected thereby eliminating the problem outlined in the above background of description.

A method and apparatus for partially cutting hock joints, and letting feet remain attached to the rest of the carcass by skin and one or more tendons, exposing the hock joint by folding feet, and hanging the carcasses in the evisceration shackles by hock joints, is a method and apparatus that unambiguously ensures that if a carcass is condemned by an Inspector, the feet belonging to that carcass are condemned as well. Furthermore, this invention solves the even more intractable problem of capturing folded feet, separating feet from the carcass while leaving the carcass still hanging in the shackles, transferring feet into an infeed paw cutter wheel, and cutting knuckle portion to produce chicken paws ready for further processing.

These and other advantageous features of the present invention will be in part apparent and in part pointed out herein below.

BRIEF DESCRIPTION OF THE DRAWINGS

For a better understanding of the present invention, reference may be made to the accompanying drawings in which.

DETAILED DESCRIPTION OF INVENTION

Figure 1:
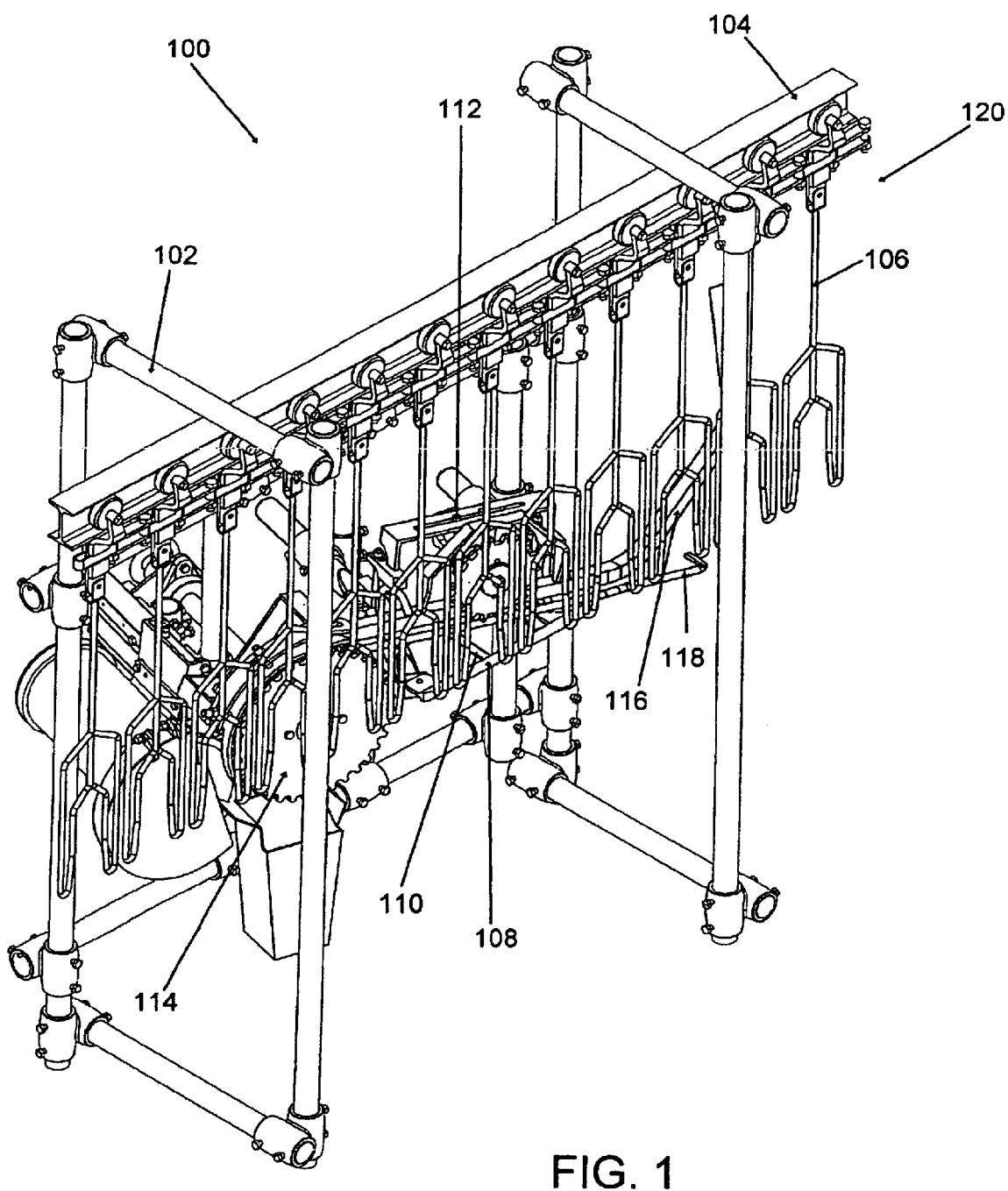
FIG. 1 is a rear left side perspective view of the feet harvesting and paw production apparatus is shown.

According to the embodiment(s) of the present invention, various views are illustrated in FIG. 1–9 and like reference numerals are being used consistently throughout to refer to like and corresponding parts of the invention for all of the various views and figures of the drawing. Also, please note that the first digit(s) of the reference number for a given item or part of the invention should correspond to the FIG. number in which the item or part is first identified.

One embodiment of the present invention comprising a method and apparatus for partially severing the hock joint leaving the feet attached, re-hanging the bird on an evisceration shackle, inspecting the bird and completely severing the hock which teaches a novel apparatus and method for harvesting edible feet.

Birds are hung on the kill line shackles by their feet. In a typical poultry plant in the U.S., at one point they go through a scald process where the birds (including their feet) are immersed in hot water. Kill line shackles may go through one or a series of brushes that capture feet and remove most of cuticle and any surface contaminants like fecal balls off the feet. In most cases, a hock cutter is used to severe hock joint to separate feet from the rest of the carcass. However, this invention requires that hock joint be not completely cut so that the feet remain tenuously (either by skin or by skin and a few tendons) attached to the rest of the bird. This can be performed by an adjustable blade that can be adjusted to sever the hock joint without completely severing through the joint.

The birds are unloaded from the kill line shackles and transferred to evisceration line shackles either manually or mechanically. On the evisceration shackles, the carcasses hang by the hock joint with feet folded over such that the joint is on one side of the shackle and the feet extend through the shackle and out on the opposing side so that the hock joint is fully visible to USDA inspectors. The carcasses go through the evisceration process as they always have. There are no changes to be made in any of the evisceration equipment to process birds hanging with the feet folded over the hock joint.

When the carcasses are inspected by USDA inspectors, if they decide to condemn a carcass, the feet are condemned with it 100% of the time. The remaining portion of the invention is physically located on the evisceration line after the Inspectors. As the carcasses and the shackles enter the machine, a specially designed mechanism captures the shackles holding them steady. The mechanism comprises a sprocketed or tabbed belt where the sprockets or the tabs extend horizontally outward from the belt portion extending between the legs of the carcass thereby holding or forcing the carcass downward such that the carcass hock joint is held in the shackle. This holds the shackle steady. The mechanism also assures that the carcasses stay rigid and do not move in any direction. Simultaneously, a double bird guide bar or guide rail gently captures the feet. The guide bar or guide rail is angled away from the approaching carcass to pull the foot away from the bird. All evisceration shackles are modified so that there is a bend in the evisceration shackle at a certain point above the bottom of the shackle creating a wider open area through which the hock joint can be released. The guide bar is inclined so that as the evisceration shackle moves horizontally, the feet in the shackle tend to rise with the incline of the guide rails, and as the feet portion of the joint rises to pop out and through the bend in the shackle, a specially designed knife separates the feet from the rest of the carcass. The guide bar or guide rail has an upper and lower portion and the feet of the carcass are positioned between the upper and lower portions. The upper and lower guide rails have an equidistant gap therebetween over at least a portion of their length. The guide rails also preferably have extension members or extension portions that angle outward from each other to assure the feet are received in the gap. The blade is mounted on a blade mount assembly. The blade can be stationary and positioned such that the hock joint moves across the edge of the blade as it pops out or is released out and through the open area of the shackle at the bend in the shackle. The blade can be canted upward to engage the hock joint as the carcass is conveyed through the station. The blade can be an upwardly curved crescent shaped blade or an upwardly canted straight blade or any other appropriate blade design. The bend in the shackle assists in allowing the hock joint to pop up slightly such that the remaining tendons and skin can be positioned to be severed by the blade. A powered rotatable sprocketed guide wheel which is preferably hydraulically driven moves the feet along the guide bar and feeds them into a cylindrical wheel of a paw cutter. The guide wheel is sprocketed such that it positions and indexes the feet appropriately. The paw cutter in its concept and design is the subject of an application for which the applicant has already applied for a patent. The paw cutter blade cuts the knuckle portion off, which falls on to a slide and can either be captured or discarded. The produced paws are pumped to a picker scalder for further processing.

The details of the invention and various embodiments can be better understood by referring to the figures of the drawing. Referring to FIG. 1 the feet harvest and paw production portion of the apparatus 100 is shown. The carcass arrives at this apparatus after the hock joint has been partially severed and the carcass has been rehung on the modified shackle. The feet harvest and paw production apparatus 100 is positioned on the evisceration portion of the line after the USDA inspection station. The feet harvest and paw production portion of the apparatus 100 includes a main frame assembly 102 which supports the conveyor 104 which carries the series of evisceration shackles 106. The evisceration shackles 106 are conveyed on conveyor 104 past the blade mount assembly 108 and the blade 110 such that the hock joint can be passed across the blade 110 thereby completely severing the hock joint severing the feet from the carcass. As the carcass is being conveyed on the evisceration shackles approaching the blade mount assembly 108, upper and lower guide rails 116 and 118 respectively capture the feet within the gap therebetween to position the feet for complete severing of the hock joint. The upper and lower guide rails 116 and 118 are canted upward or inclined in such a manner to raise up and pop the hock joint through the evisceration shackle at the bend point as it passes over the blade 110. The feet harvesting positioning and indexing mechanism 112 comprises a blade assembly frame mounted to a main frame, and a sprocketed feet indexing wheel which indexes and positions the feet and is mounted to the blade assembly frame is operable to sever the hock joint as the hock joint passes over the blade 110. The completely severed feet are then conveyed to the sprocketed paw cutting index wheel 114 where the completely severed feet are captured by the paw cutting wheel before subsequent cutting of the paw portion.

Figure 2:
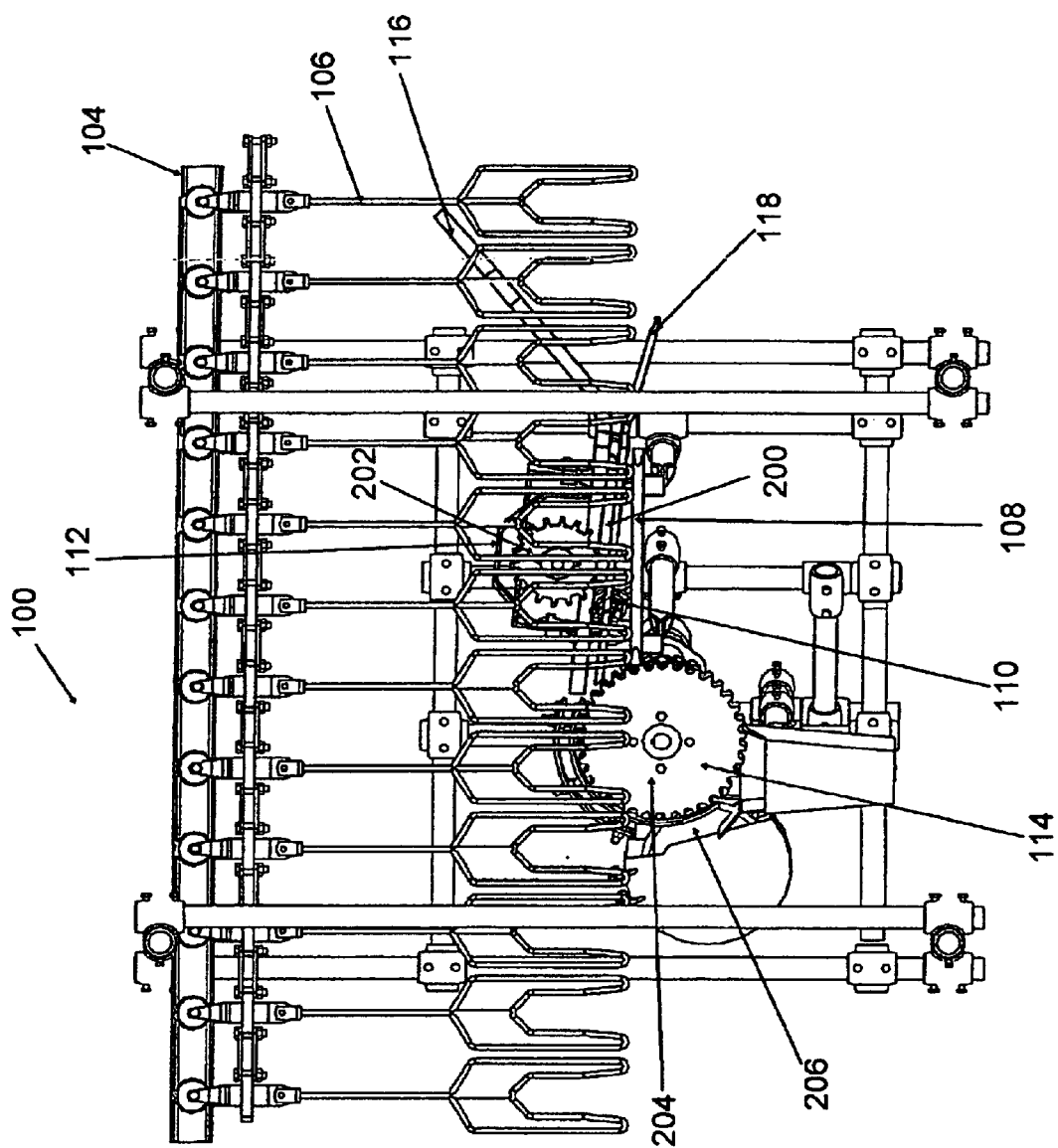
FIG. 2 is a left side view of the feet harvesting and paw production apparatus is shown.

Referring to FIG. 2, a side view of the feet harvesting and paw production apparatus is shown. The side view again shows the conveyor 104 extending through an evisceration line area with the evisceration shackles 106 being conveyed thereon. The evisceration shackles 106 are conveyed on an overhead rail where the evisceration shackles are attached to the overhead rail by a track wheel. As the carcasses that are hanging in the evisceration shackles are conveyed toward the blade apparatus 108, guide rails 116 and 118 are designed to capture and position the feet within the uniform equidistant gap 200 for appropriate positioning of the hock joint as it passes over the blade 110. The guide rails 116 and 118 are canted upward or inclined such that the gap 200 is canted upward as well which will cause the feet to move upward in the evisceration shackle such that the hock joint rises up and is released or pops through the bend in the evisceration shackle at the appropriate time thereby causing the hock joint to be completely severed as it passes across the blade 110. The sprocketed paw cutting wheel 114 then captures the completely severed foot such that the paw can be separated at the knuckle by the circular blade 206. Without the bend in the shackle and the appropriate incline of the guide bar a consistent uniform cut of the hock is not achieved.

Figure 3:
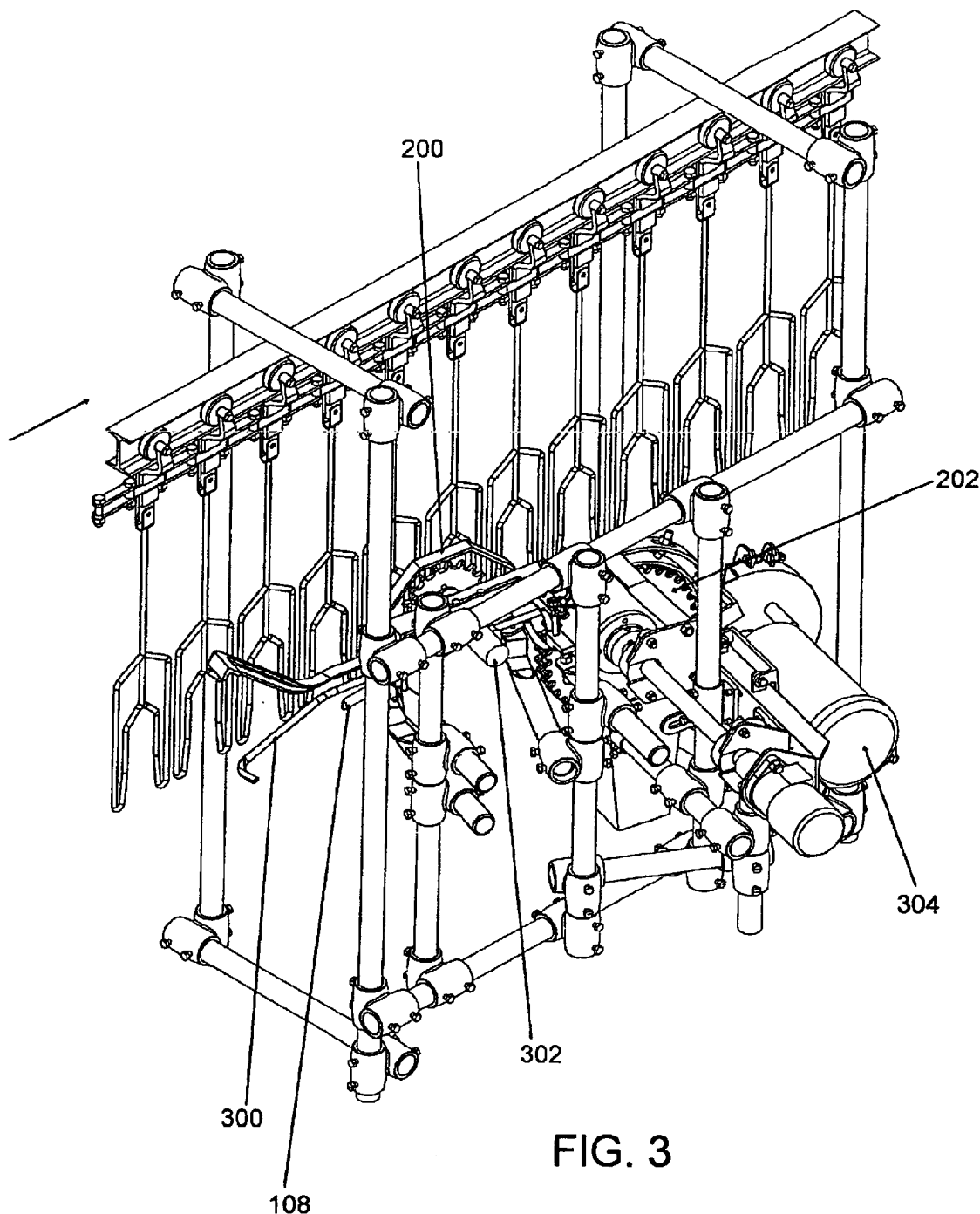
FIG. 3 is a front right side perspective view of the feet harvesting and paw production apparatus is shown.

Referring to FIG. 3 a front right side perspective view is shown which again reveals the feet harvest and paw production apparatus 100 for positioning along an evisceration line area. A front right side perspective view of the positioning and indexing apparatus 112 is partially shown. The blade mount assembly 108 and the sprocketed paw cutting indexing wheel 114 are also shown. The drive motors 302 and 304 for the feet indexing wheel and the paw indexing wheel are also shown.

Figure 4:
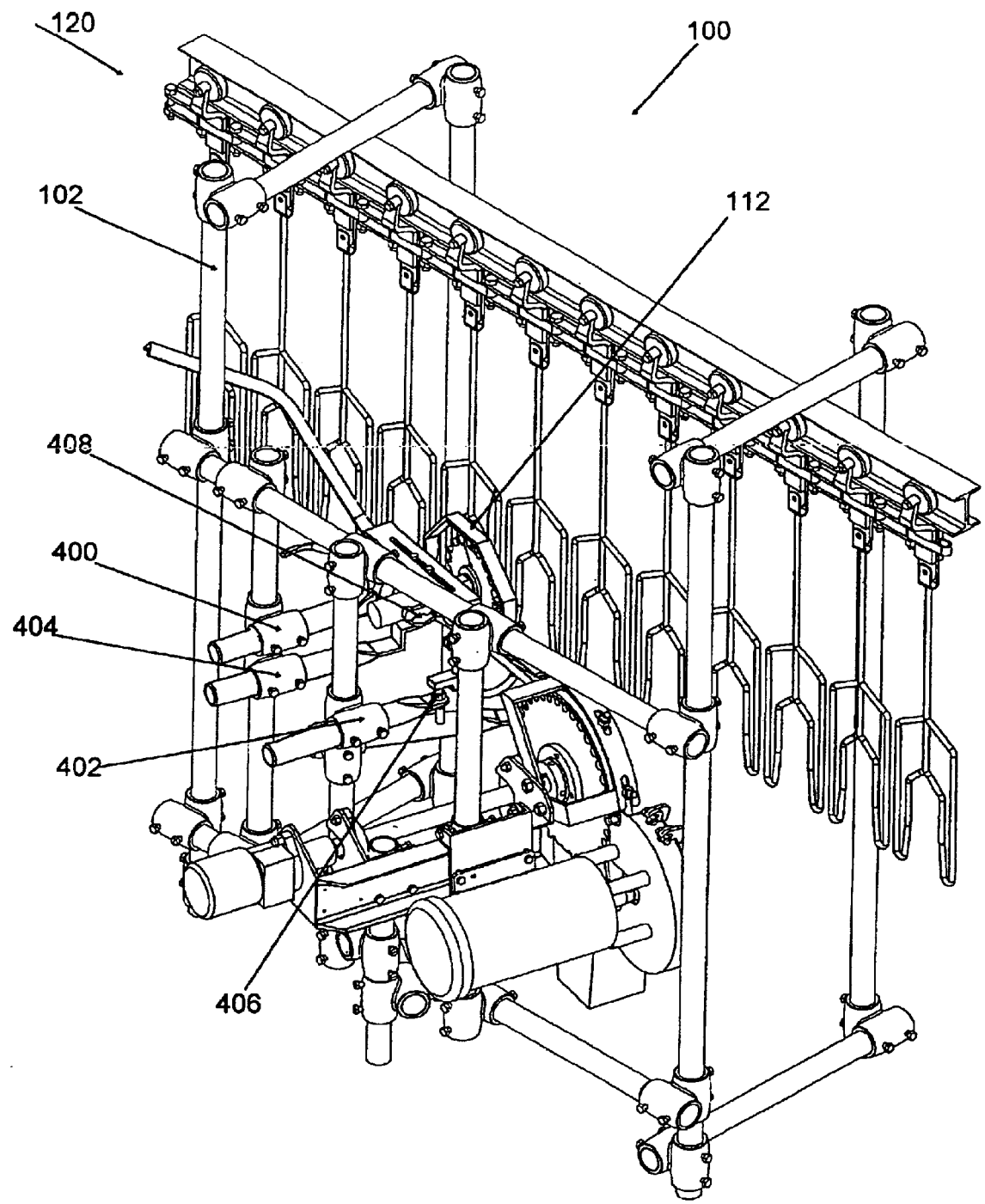
FIG. 4 is a rear right side perspective view of the feet harvesting and paw production apparatus is shown.

Referring to FIG. 4 a rear right side perspective view of the feet harvest and paw production apparatus 100 is shown. Again the main frame assembly is shown upon which the conveyor and other components are mounted. The feet harvesting and indexing apparatus 112 having a frame which is shown mounted to the frame assembly at mount points 400, 404 and 402. The feet harvesting and indexing apparatus 112 is pivotable about pivot points or pivot members 406 and 408 for appropriate alignment of the feet indexer.

Figure 5:
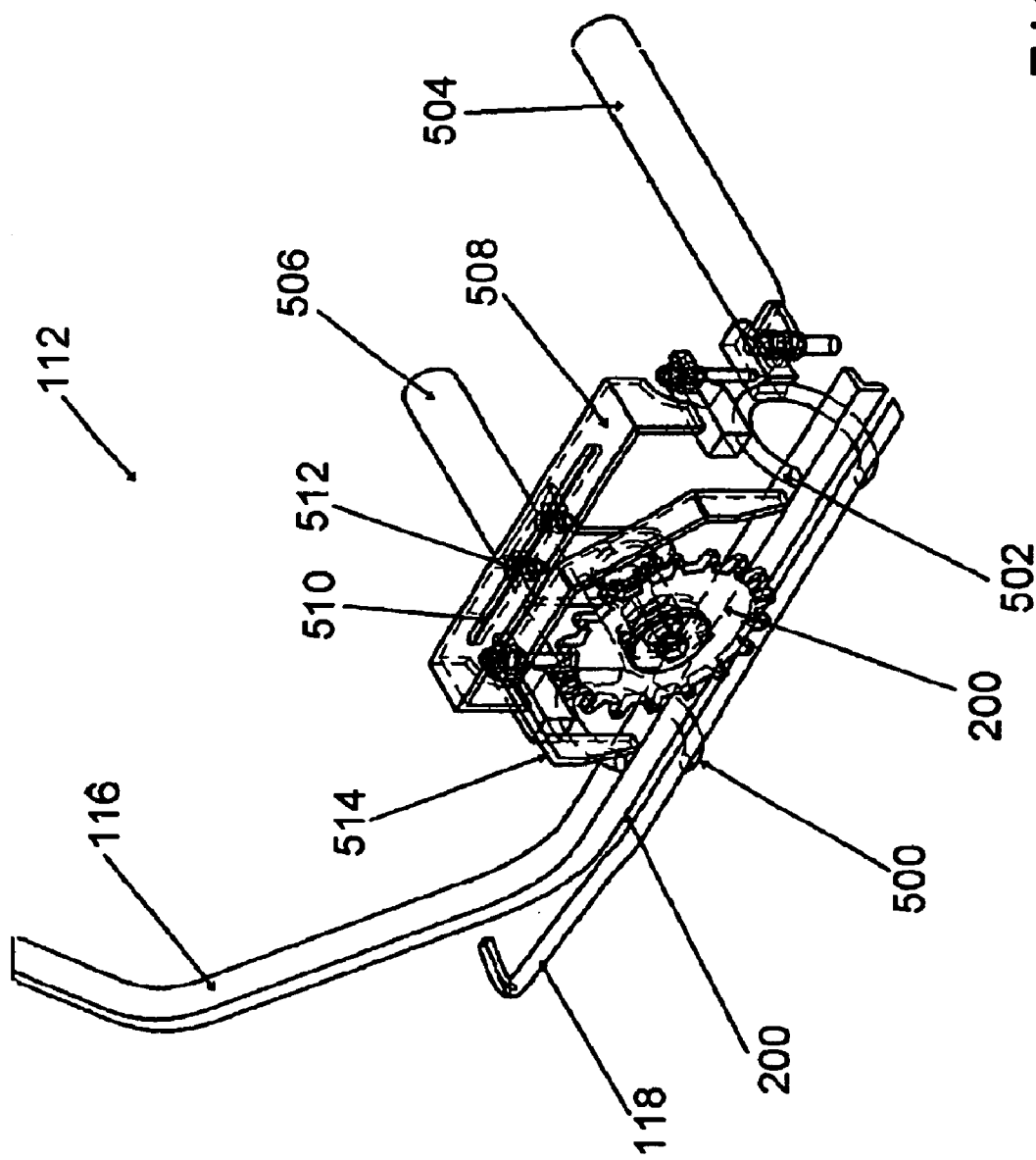
FIG. 5 is a rear right side perspective view of a feet indexer assembly.

Referring to FIG. 5 a rear right side perspective view of the feet harvesting positioner and indexer assembly 112 is shown. The mounting bars 504 and 506 are shown which are used to mount the feet harvesting and indexing assembly to the main frame assembly. The feet indexing assembly 112 comprises a sprocketed wheel assembly 514 which is mountably attached to mounting bars 504 and 506. The sprocketed wheel assembly 514 is mounted to mounting bars 504 and 506 by slotted bracket 508. The sprocketed wheel assembly 514 can be adjustably mounted to slotted bracket 508 by mounting members 512 along slot 510. The guide bars 116 and 118 are mounted to bars 504 and 506 by c-mounts 500 and 502. The upper end of the c-mount is attached to the upper guide bar 116 and the lower portion of the c-mount is attached to the lower guide bar 118. The c-bar positions the guide rails 116 and 118 such that a uniform gap 200 is therebetween. Mounting of the feet harvesting assembly 112 can be such that the assembly is angled away from the oncoming carcasses and such that the guide bars are inclined upward. As the feet are conveyed along the inclined gap the feet are pulled upward raising the hock joint in the shackle. The incline has the appropriate pitch such that the hock joint is raised and pulled through the bend in the shackle releasing the hock joint at the appropriate moment to be severed by the blade.

Figure 6:
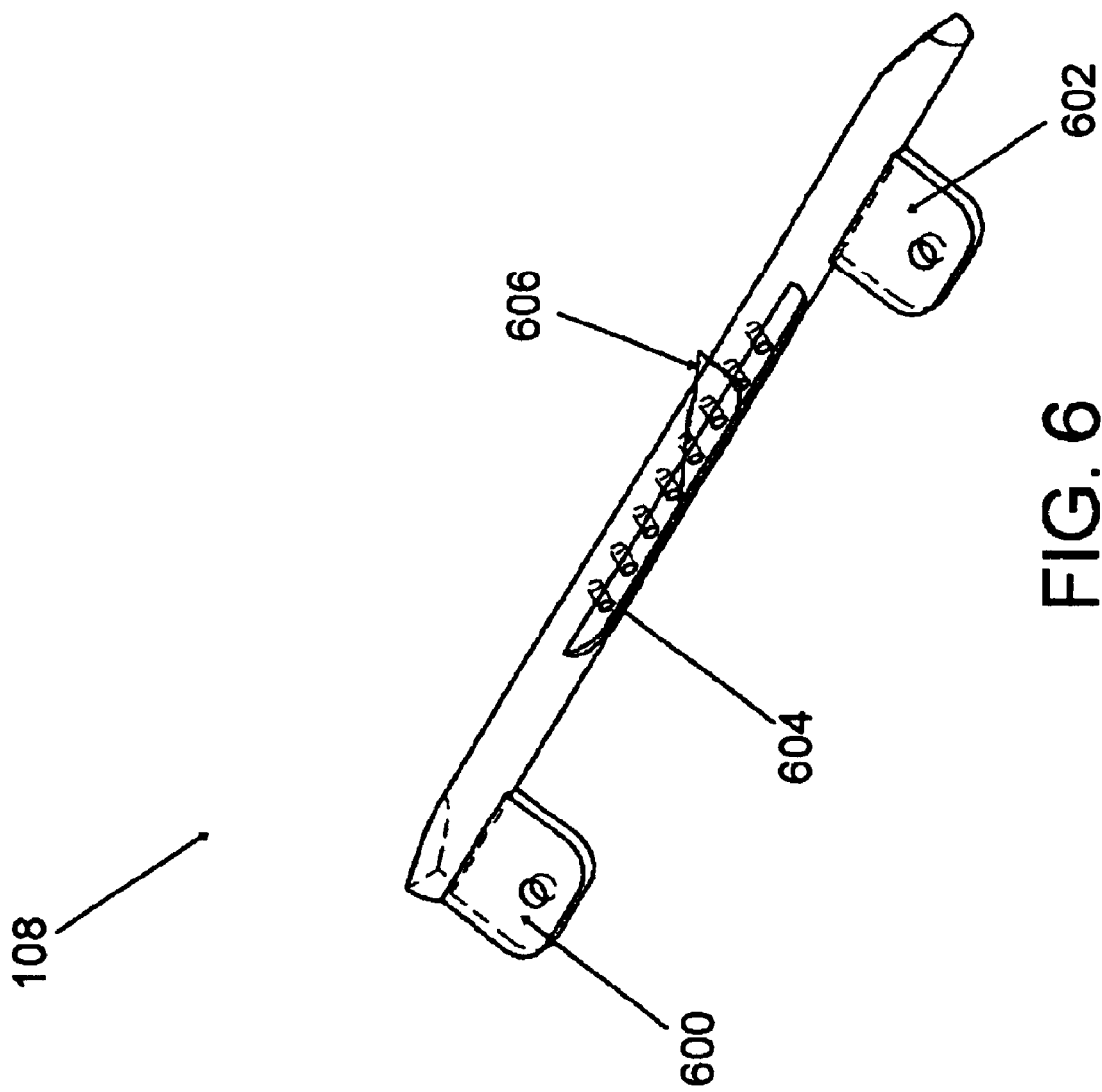
FIG. 6 is a perspective view of the hock blade assembly.

Referring to FIG. 6 a perspective view of the hock cutting blade mount assembly 108 is shown. The blade 606 of the blade mount assembly is shown with a dashed shadow line. The blade 606 can be adjustably mounted using a plurality of mounting holes 604. The blade mount assembly is mounted to the main frame of the apparatus by mounting tabs 600 and 602. The blade mount assembly 108 is mounted at the appropriate position and the blade 606 is adjustably mounted along mounting holes 604. The blade 606 can be a blade design having alternative shapes. The blade can be an elongated rectangular shaped blade with a sharpened edge, a crescent shaped or curved blade, a triangular blade as shown in FIG. 6, or any other appropriate shape or design. The blade is positioned such that as the hock joint pulls through the bend in the evisceration shackle releasing it, the hock joint will pass across the blade 606 thereby completely severing the feet from the carcass.

Figure 7A:
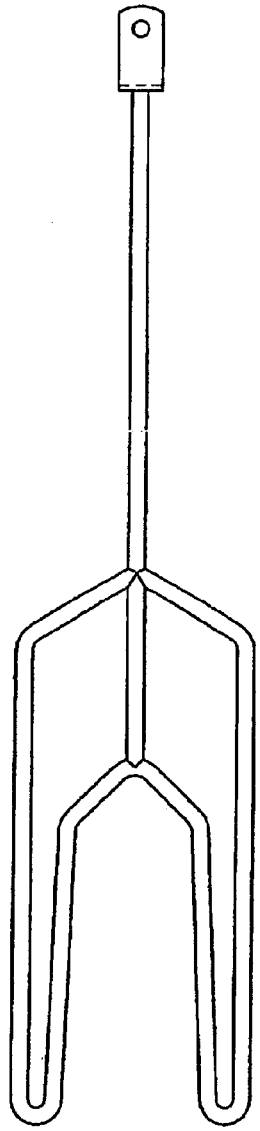
FIG. 7a is a side view of a PRIOR ART shackle.
Figure 7B:
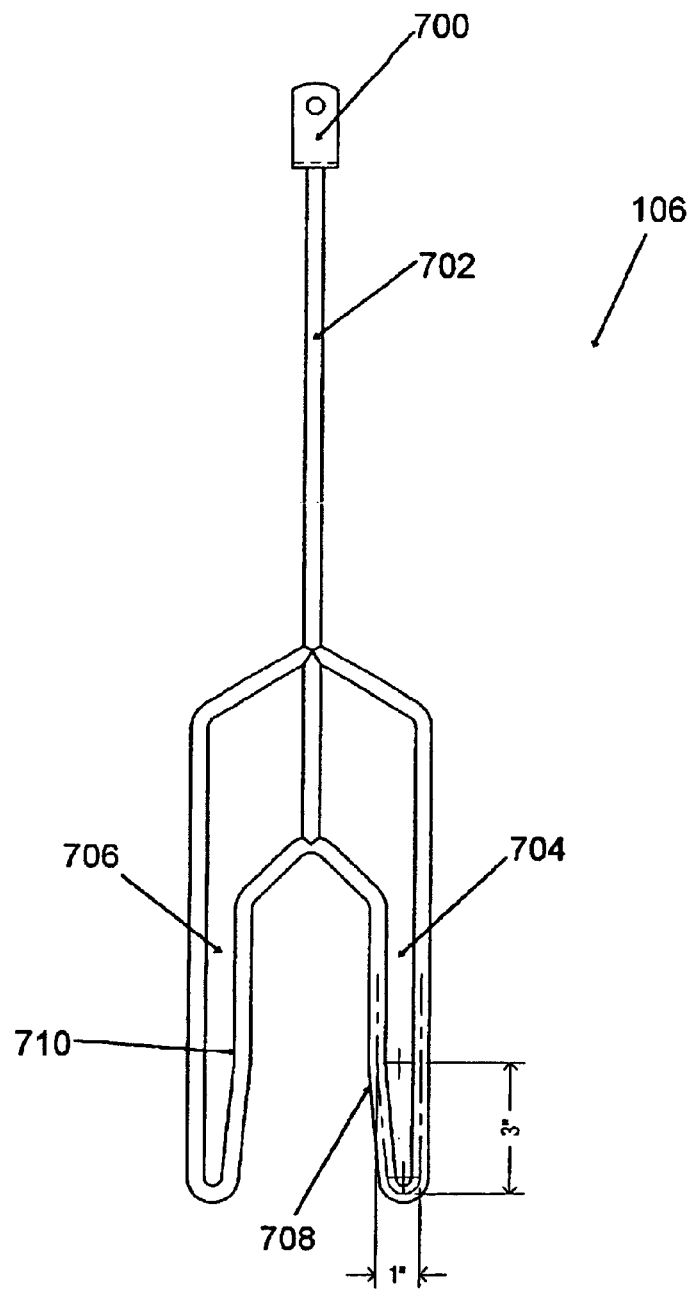
FIG. 7b is a side view of the shackle of the present invention.

Referring to FIGS. 7a and 7b the prior art evisceration shackle is shown in FIG. 7a. The evisceration shackle that is part of the present invention is shown in FIG. 7b and is not in the prior art. The evisceration shackle shown in FIG. 7b includes a mounting bearing 700 through which a pin is inserted thereby mounting the evisceration shackle to the conveyor. The mounting of the bearing 700 to the conveyor by a pin allows the evisceration shackle to freely swing back and forth in a multi-directional fashion. A rod 702 extends from the mounting bearing 700 to the hangar portion 712 of the evisceration shackle. The hanger portion 712 of the evisceration shackle is a rod formed to create left and right shackle hanging open areas 706 and 704 respectively on which the hock joints of the carcasses are hung. The left and right shackle areas 706 and 704 are tapered to narrow at the lower end of the shackle area. The prior art shown in FIG. 7a teaches a uniform taper for receiving and holding the hock joint. The present invention teaches a shackle area having a lower end with a straight upper portion and a tapered lower portion thereby creating a bend 710. This bend allows the hock joint to consistently pull through at the bend 710 as it is raised due to the incline of the guide bars at the appropriate moment such that the hock joint is completely severed by the stationery blade of the present invention. The bend 710 allows the feet side of the hock joint to consistently slip through the shackle at the bend therefore allowing for consistent complete cutting of the hock joint. The shackle can be described as two adjacent rod members forming the left and right shackle hanging open areas 706 and 704 where the lower end of the rod members each form a substantially u-shaped elongated bend for receiving both hock joints in the bend where each of the substantially u-shaped bends for adjacent elongated leg pairs extending upward from each bend and said leg portions are parallel over a portion of their length and at least one of each of the adjacent leg pairs inwardly tapers.

Figure 8:
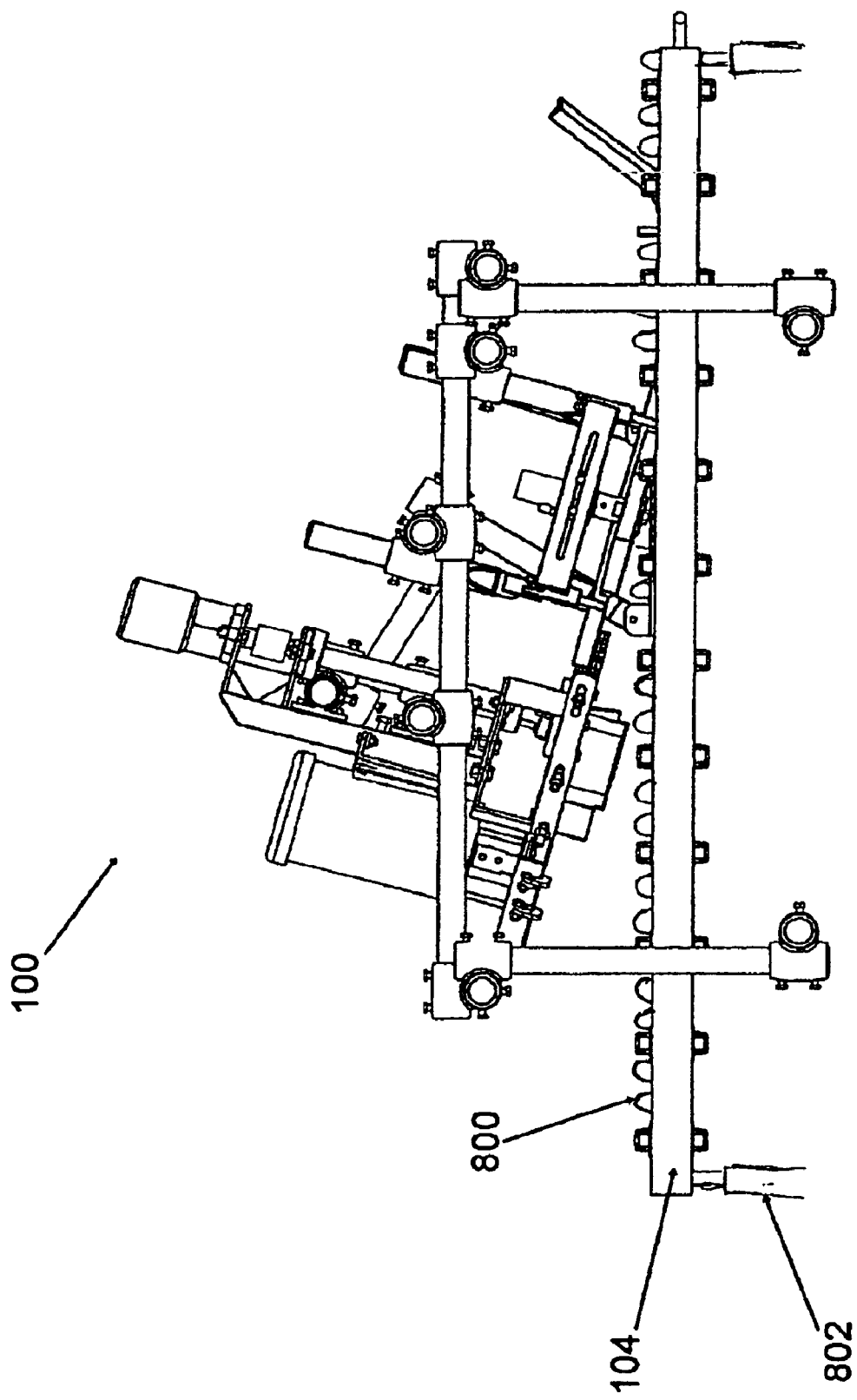
FIG. 8 is a top plane view of the system for remaining paws.

Referring to FIG. 8 a top plane view of the feet harvest and paw production apparatus 100 is shown. The top plane view reveals that the assembly for the feet cutting and paw cutting are positioned at an angle with respect to the conveyor 104. This angle assists in removing the feet from the carcass by pulling feet away from the carcass and allows the carcass to continue down the conveyance path unobstructed once the feet have been severed. The top plane view also reveals a plurality of laterally extending sprockets 800 or tabs where the sprockets or the tabs extend horizontally and laterally outward from a conveyance belt such that the sprockets extend between the legs of the carcass being conveyed, and thereby holding and/or forcing the carcass downward such that the carcass hock joint is held securely in the shackle. Forcing the carcass downward also tends to hold the shackle steady as it is conveyed adjacent the feet cutting and paw cutting assemblies. The mechanism also assures that the carcass remains somewhat rigid and does not move in any direction. Therefore, when the guide rails 116 and 118 captures the feet of the carcass and pulls the hock joint through the bend in the shackle due to the upward cant of the guide bar, the carcass is held firmly below by the sprocketed or tabbed conveyor. Guide rail 802 is shown which urges the shackle laterally towards the feet harvesting and paw production stations.

Figure 9:
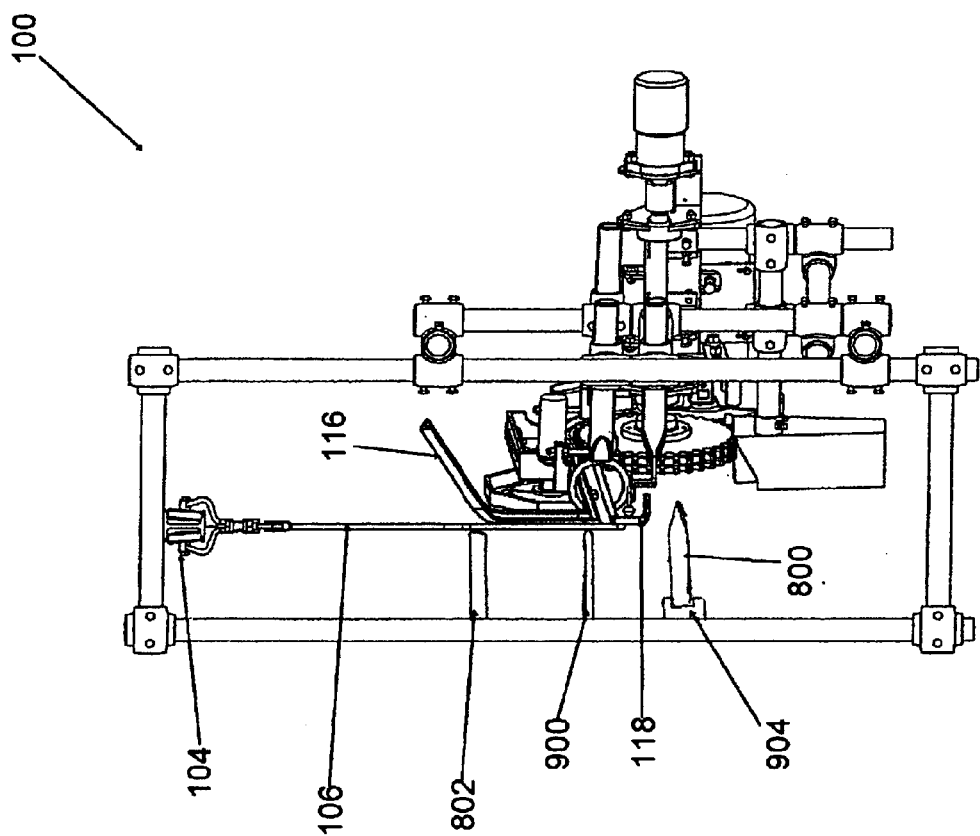
FIG. 9 is a front view of the apparatus.

Referring to FIG. 9 a front view of the feet harvesting and paw production apparatus 100 is shown. The front view shows the shackle 106 hanging from the conveyor 104 and extending downward to a position adjacent the paw cutting and feet harvesting stations. Guide rails 802 and 900 are shown which urge the shackle laterally towards the feet harvesting and paw production stations. These guide rails 802 and 900 in addition to the guide bars 116 and 118 and the sprocketed conveyor 904 with the sprockets 800 extending therefrom to assist in positioning the carcass and more specifically in positioning the hock joint for complete severing of the feet from the carcass. The feet harvesting and paw production apparatus 100 is located in the evisceration line area after the inspection station for systemic issues and after evisceration. Carcasses are segregated based on whether they are accepted or rejected by the inspector. If the inspector accepts the carcass they are conveyed to apparatus 100 for further operation to remove feet.

Figure 10B:
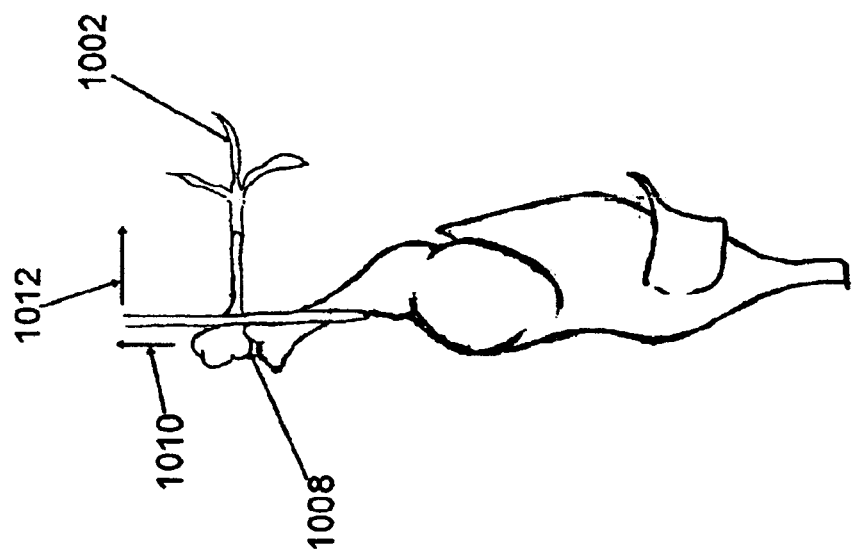
FIGS. 10a, 10b and 10c illustrate a poultry carcass hanging from a shackle by a partially severed hock joint.
Figure 10A:
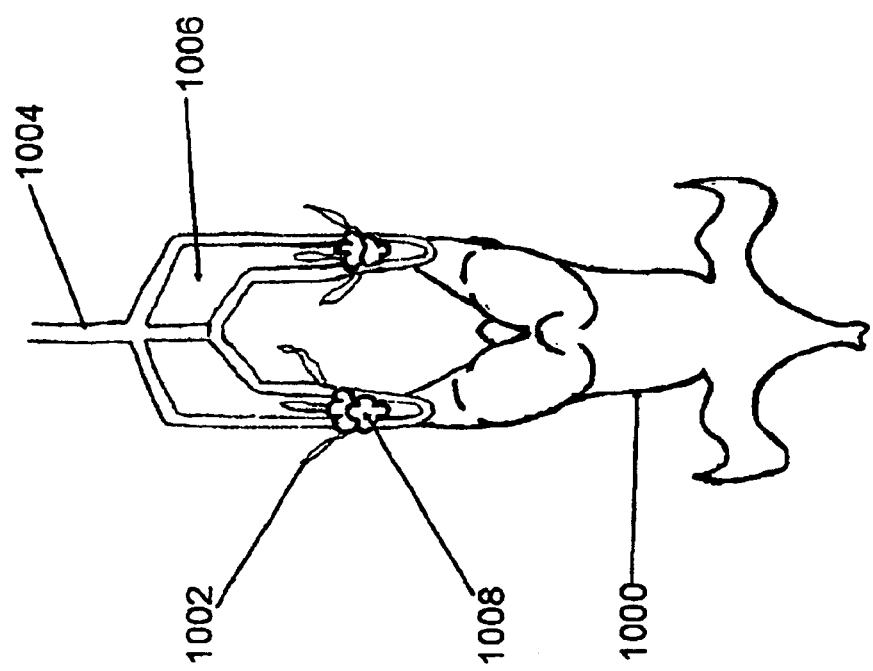
Figure 10C:
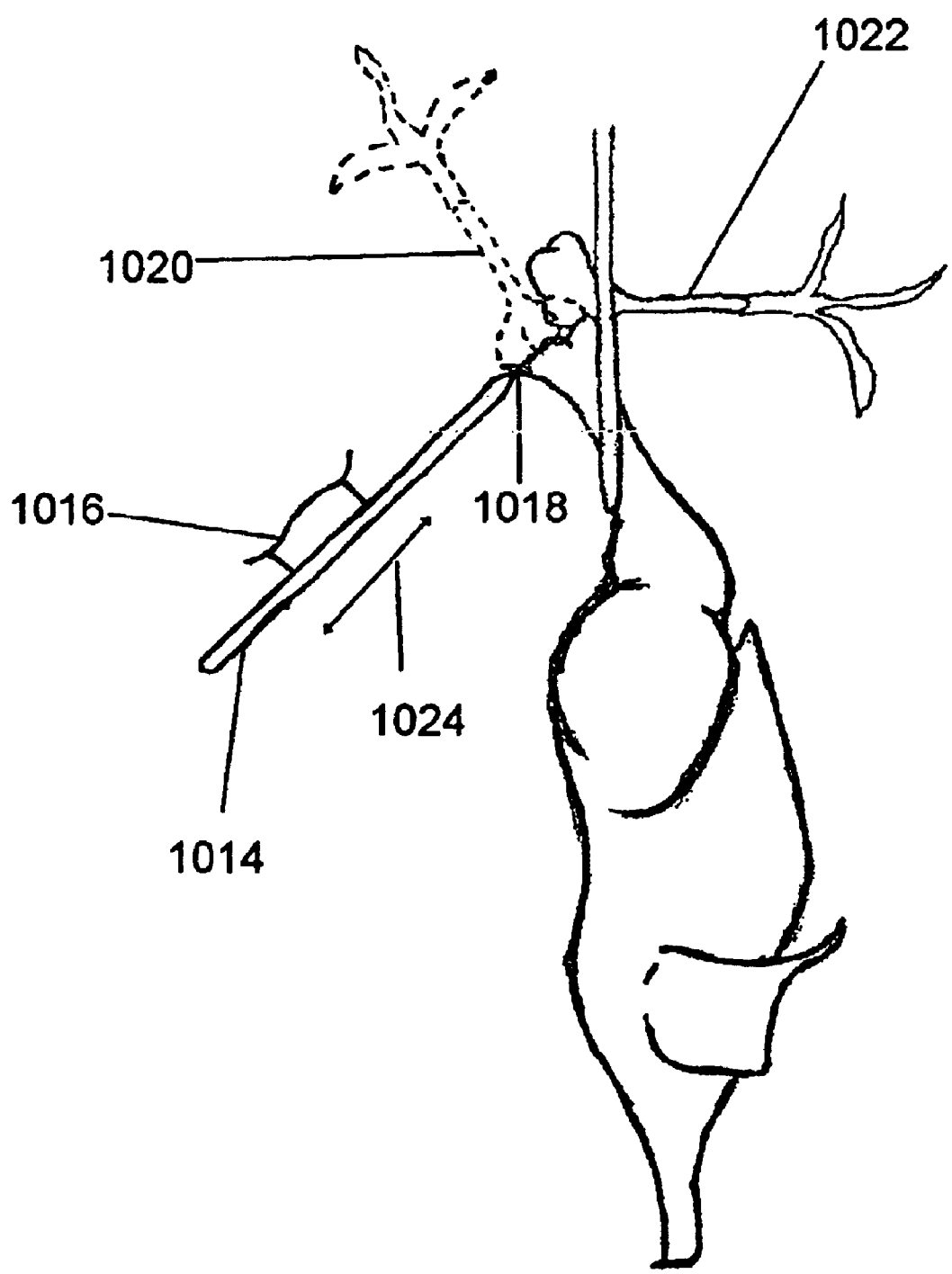

Referring to FIGS. 10a, 10b and 10b, the poultry carcass 1000 is shown hanging from a shackle 1004. The hock joint 1008 is partially severed and the feet 1002 of the carcass are folded over such that the hock joint extends through the opening 1006 of the shackle to one side of the shackle 1004 and the folded over feet 1002 extended through the opening 1006 to the opposing side of the shackle. Referring to FIG. 10c, an illustration of an adjustable hock joint blade 1016 is shown having an adjustable blade 1014 whose cutting depth can be bi-directionally adjusted as indicated by arrow 1024 to sever the hock joint 1018. Shadow lines 1020 show the feet of the poultry carcass prior to partially severing the hock joint 1018. Referring to FIG. 10b, arrow 1010 illustrates the direction that the hock joint moves as the feet are conveyed through the guide rails. The hock joint moves upward as indicated by arrow 1010 towards the bend in the shackle such that the lower portion of the hock joint pulls through at the bend as indicated by arrow 1012 such that the remaining tendons and skin are severed in order to totally sever the hock joint. The severed foot 1022 is then captured for separating the paw from the remainder of the severed foot 1022.

The various embodiments and various feet harvesting methods and apparatus examples shown above illustrate a method and apparatus for harvesting edible feet from a poultry carcass. A user of the present invention may choose any of the above embodiment, or an equivalent thereof, depending upon the desired application. In this regard, it is recognized that various forms of the subject feet harvesting method and apparatus could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A method for harvesting edible feet from a poultry carcass comprising the steps of:

severing partially both hock joints of a carcass leaving both feet tenuously attached;

hanging the carcass in a hanging shackle by the hock joint such that the partially severed hock joint is fully exposed;

presenting the carcass for inspection of systemic issues with the feet tenuously attached such that the feet can be rejected or accepted with the carcass; and severing completely the hock joint such that the feet are no longer attached to the carcass if the carcass is accepted.

2. The method of harvesting edible feet as recited in claim 1 where hanging the carcass further comprises:

folding both feet over about the partially severed hock joint and hanging the hock joint in the shackle such that the hock joint extends through to one side of the shackle and the folded over feet extend through the opposing side.

3. The method of harvesting edible feet as recited in claim 2 further comprising the steps of:

capturing the feet extending from the opposing side of the shackle between upper and lower elongated inclined guide rails where the incline of the rails causes the feet to rise up in the shackle such that the hock joint can release through.

4. A method for harvesting edible feet from a poultry carcass comprising the steps of:

hanging a carcass having partially severed hock joints such that the carcass is hung by both hock joints in a hanging shackle being conveyed through an evisceration line area with the hock joint fully exposed for inspection and said hock joints extending through the shackle on a first side of the shackle and both feet extending through the shackle to an opposing side prior to inspection for systemic issues; and severing completely the hock joint such that the feet are no longer attached to the carcass if the carcass is accepted after the carcass has been inspected for systemic issues.

5. The method for harvesting edible feet as recited in claim 4 where hanging a carcass further comprises the steps of:

folding the feet of the carcass over about the hock joint.

6. The method for harvesting edible feet as recited in claim 5 were severing further comprises the steps of:

capturing both feet of the carcass extending from the hock joint between upper and lower inclined guide rails with an equidistant gap extending there between; and conveying the carcass hung in the shackle such that the feet travel along the gap in the direction of conveyance and said feet rise upward with the incline of the rails causing the hock joint to rise upward in the shackle and pull through the shackle as the hock joints travel across and are severed by a stationery blade.

7. The method for harvesting edible feet as recited in claim 6 further comprising the step of indexing the feet with a sprocketed indexing wheel as they are conveyed along the gap.

8. A method for harvesting edible feet from a poultry carcass comprising the steps of:

severing partially both hock joints of a carcass leaving both feet tenuously attached;

folding the feet upward bending at the hock joint toward the leg fully exposing the hock joints for inspection; and hanging the carcass in a hanging shackle being conveyed through an evisceration line area by both partially severed hock joints with the hock joints extending through the shackle on a first side of the shackle and both feet extending through the shackle to an opposing side prior to inspection for systemic issues.

9. The method for harvesting edible feet as recited in claim 8 where severing partially is performed with an adjustable blade operable to adjust the cutting depth such that the hock joint is only partially severed.

10. The method for harvesting edible feet as recited in claim 9 further comprising the steps of:
   capturing the feet extending through the shackle within an equidistant gap extending between an upper and lower guide rail where each rail is inclined;
   conveying the carcass such that the feet travel along the gap causing the feet to rise upward with the incline and causing the hock joints to rise upward in the shackle and release through to the opposing side;
   indexing the feet with a sprocketed indexing wheel as the feet travel along the gap; and
   severing completely the hock joint as it is released through to the opposing side.

11. A method for harvesting edible feet from a poultry carcass comprising the steps of:
   conveying through an evisceration line area a carcass hanging from a shackle by both partially severed hock joints with the hock joints fully exposed for inspection and with the feet tenuously attached and extending from the shackle;
   presenting the carcass for inspection of systemic issues such that the feet can be rejected or accepted with the carcass; and
   segregating carcasses and attached feet that are rejected for the presence of systemic issues from carcasses and attached feet that are accepted during inspection.

12. The method for harvesting edible feet as recited in claim 11 further comprising the step of:
   severing completely the hock joints with a blade to separate the feet from the carcass if the carcass and attached feet are accepted during inspection.

13. The method for harvesting edible feet as recited in claim 12 where severing completely further comprises the steps of:
   capturing both feet of the carcass extending from the hock joints between upper and lower inclined guide rails with an equidistant gap extending there between; and
   conveying the carcass hung in the shackle such that the feet travel along the gap in the direction of conveyance and said feet rise upward with the incline causing the hock joint to rise upward in the shackle and pull through the shackle and release as the hock joints travel across and are severed by a stationery blade.

14. The method for harvesting edible feet as recited in claim 13 further comprising the step of indexing the feet with a sprocketed indexing wheel as they are conveyed along the gap.

15. A method for harvesting edible feet from a poultry carcass comprising the steps of:
   severing partially both hock joints of a carcass leaving both feet tenuously attached;
   folding the feet upward bending at the hock joint toward the leg fully exposing the hock joints for inspection;
   hanging the carcass having partially severed hock joints in a hanging shackle being conveyed through an evisceration line area by both hock joints with the hock joints fully exposed for inspection and extending through the shackle on a first side of the shackle and both feet extending through the shackle to an opposing side prior to inspection for systemic issues;
   presenting the carcass for inspection of systemic issues such that the feet can be rejected or accepted with the carcass;
   segregating carcasses and attached feet that are rejected for the presence of systemic issues from carcasses and attached feet that are accepted during inspection; and
   severing completely the hock joints such that the feet are no longer attached to the carcass after the carcass has been inspected for systemic issues for those carcasses and attached feet that are accepted.

16. The method for harvesting edible feet as recited in claim 15 were severing further comprises the steps of:
   capturing both feet of the carcass extending from the hock joints between upper and lower inclined guide rails with an equidistant gap extending there between;
   conveying the carcass hung in the shackle such that the feet travel along the gap in the direction of conveyance and such that said feet rise upward with the incline causing the hock joints to rise upward in the shackle and pull through the shackle and release as the hock joints travel across and are severed by a stationery blade.

17. The method for harvesting edible feet as recited in claim 16 further comprising the step of indexing the feet with a sprocketed indexing wheel as they are conveyed along the gap.

18. An apparatus for harvesting edible feet from a poultry carcass comprising:
   an evisceration area further comprising:
      a main frame;
      an overhead conveyor rail mounted to said main frame and having evisceration shackles hanging therefrom and operable to convey the shackles through an evisceration line area with carcasses hanging on the shackles
      an inspection station positioned adjacent the overhead conveyor and optimal for viewing shackles where inspection for systemic issues of the carcass hanging in said shackles can be performed; and
      a hock cutting blade assembly mounted to said main frame and downstream from the inspection station and operable to sever both hock joints of the carcass to remove both feet from the carcass if accepted at the inspection station.

19. The apparatus for harvesting edible feet as recited in claim 18 where the hock cutting blade assembly further comprises:
   a blade assembly frame;
   an upper and lower guide rails mounted to said blade assembly frame having a uniform equidistant gap there between for receiving therein and capturing both feet extending from a shackle being conveyed, where said upper and lower rails are inclined upward;
   a powered sprocketed rotatable indexing wheel mounted to said blade assembly frame adjacent said guide rails for indexing the feet as they are conveyed along the gap; and
   a blade assembly mounted to said main frame having a hock blade extending therefrom for severing skin and tendons tenuously connecting the hock joint.

20. The apparatus for harvesting edible feet as recited in claim 18 where the evisceration shackles further comprises:
   two adjacent rod members each rod member having a substantially u-shaped elongated bend for receiving both hock joints in the bends where each of the substantially u-shaped bends form adjacent elongated legs extending from each of the bends where the adjacent legs extending from each bend are parallel over a portion of their length and at least one of each of the adjacent legs inwardly tapered over the remainder of the length.

21. An apparatus for harvesting edible feet from a poultry carcass comprising:
- a frame;
- an upper and lower guide rails mounted to said frame having a uniform equidistant gap there between for receiving therein and capturing both feet extending from a shackle being conveyed, where said upper and lower rails are inclined upward;
- a powered sprocketed rotatable indexing wheel mounted to said frame adjacent the upper and lower guide rails for indexing the feet as they are conveyed along the gap; and
- a blade mounting assembly mounted to said frame adjacent the guide rails and having a hock blade extending therefrom for severing skin and tendons tenuously connecting a hock joint.

22. The method for harvesting edible feet as recited in claim 21 where the upper and lower guide rails each have an extended elongated member that angles outward away from each other creating a wider entry to assure the feet are captured.

23. An apparatus for harvesting edible feet from a poultry carcass comprising:
- a main frame;
- an overhead conveyor rail mounted to said frame and operable to convey an evisceration shackle freely hanging from said conveyor rail where said shackle has adjacent left and right hanging loops and where the lower end of the loops each have, a first section with inwardly narrowing tapered opposing inner sides below a second section where each have straight opposing inner sides forming an outward bend in each of the inner sides;
- an upper and lower guide rail mounted to said main frame adjacent said conveyor and having a uniform equidistant gap there between for receiving therein and capturing both feet extending from a shackle being conveyed, where said upper and lower rails are inclined upward;
- a powered sprocketed rotatable indexing wheel mounted to said frame adjacent said rails for indexing the feet as they are conveyed along the gap; and
- a blade mounting assembly mounted to said frame adjacent said wheel and having a hock blade extending therefrom for severing skin and tendons tenuously connecting the hock joint.

24. An apparatus for harvesting edible feet as recited in claim 23 further comprising:
- a sprocketed conveyor mounted to said frame and having a plurality of equally spaced sprocketed tabs laterally extending therefrom and positioned to capture and hold and index the carcass and the shackle.

25. An apparatus for harvesting edible feet from a poultry carcass comprising:
- an evisceration shackle having two adjacent rod members, each rod member having a substantially u-shaped elongated bend for receiving both hock joints in the bends where each of the substantially u-shaped bends form adjacent elongated leg pairs extending from each of the bends where the adjacent legs extending from each bend are parallel over a portion of their length and at least one of each of the adjacent leg pairs inwardly tapers over the remainder of the length.

* * * * *